US012056289B2

(12) United States Patent
Cerini (10) Patent No.: US 12,056,289 B2
(45) Date of Patent: Aug. 6, 2024

(54) DIGITAL PENMANSHIP (71) Applicant: Rensselaer Polytechnic Institute, Troy, NY (US)

(72) Inventor: Arielle Nicole Cerini, Mechanicville, NY (US)

(73) Assignee: Rensselaer Polytechnic Institute, Troy, NY (US)

(*) Notice: Subject to any disclaimer, the term of this patent is extended or adjusted under 35 U.S.C. 154(b) by 0 days.

(21) Appl. No.: 18/130,492

(22) Filed: Apr. 4, 2023

(65) Prior Publication Data
US 2023/0315216 A1  Oct. 5, 2023

Related U.S. Application Data (63) Continuation-in-part of application No. PCT/US2022/022756, filed on Mar. 31, 2022.

(60) Provisional application No. 63/327,090, filed on Apr. 4, 2022.

(51) Int. Cl.
G06F 3/023 (2006.01)
(52) U.S. Cl.
CPC .................. G06F 3/0233 (2013.01)
(58) Field of Classification Search
CPC ... G06F 3/0233; G06F 2203/011; G06F 3/023
See application file for complete search history.

(56) References Cited

U.S. PATENT DOCUMENTS

| 5,319,358 | A | * | 6/1994 | Martinez | G06K 15/02 345/10 |
| 5,959,634 | A | * | 9/1999 | Yoshida | G06K 15/02 345/472 |
| 6,053,647 | A | * | 4/2000 | Parkinson | G06F 3/0219 400/489 |
| 7,042,442 | B1 | * | 5/2006 | Kanevsky | G06F 3/017 345/157 |

(Continued)

FOREIGN PATENT DOCUMENTS

CN   109241750 A   1/2019

OTHER PUBLICATIONS

International Search Report and The Written Opinion of the International Searching Authority, International Application No. PCT/US2022/022756, mailed Aug. 3, 2022.

*Primary Examiner* — Jose R Soto Lopez
(74) *Attorney, Agent, or Firm* — Barclay Damon LLP; Anthony P. Gangemi (57) ABSTRACT

A method of altering the depiction of digital text input by a user, including: receiving a set of keystrokes on a keyboard input by the user, the set of keystrokes including a plurality of text characters configured to be rendered on a display in communication with the keyboard; determining a keystroke dynamics of the user based on the set of keystrokes, the keystroke dynamics including time-of-flight data and dwell time data for each keystroke of the set of keystrokes; analyzing the set of keystrokes with the keystroke dynamics to determine the hand dominance of the user and to generate a keystroke score for each keystroke of the set of keystrokes; altering at least a portion of the text characters based on the analysis of the set of keystrokes with the keystroke dynamics; and rendering the at least partially altered text characters on the display.

20 Claims, 7 Drawing Sheets (56) References Cited

U.S. PATENT DOCUMENTS

| | | | |
|---|---|---|---|
| 7,509,686 B2 | 3/2009 | Checco | |
| 7,706,574 B1* | 4/2010 | Ross | G06V 40/30 382/119 |
| 8,134,449 B2* | 3/2012 | Wu, Jr. | G06F 21/31 707/603 |
| 8,230,232 B2* | 7/2012 | Ahmed | G06F 21/36 713/186 |
| 8,332,932 B2* | 12/2012 | Kellas-Dicks | G06F 21/316 726/19 |
| 8,489,635 B1* | 7/2013 | Phoha | G06F 21/316 713/184 |
| 8,766,823 B2* | 7/2014 | Zilberman | G06F 21/316 341/23 |
| 8,997,191 B1* | 3/2015 | Stark | G06F 21/32 726/19 |
| 9,430,626 B1* | 8/2016 | Rome | G06F 21/32 |
| 10,503,919 B2* | 12/2019 | Effendi | G06F 21/32 |
| 10,506,979 B2* | 12/2019 | Giancardo | A61B 5/7278 |
| 10,652,238 B1* | 5/2020 | Edwards | H04L 63/102 |
| 10,693,661 B1* | 6/2020 | Hamlet | G06F 21/31 |
| 11,003,839 B1* | 5/2021 | Hatch | G06F 40/166 |
| 11,222,101 B1* | 1/2022 | Zaslavsky | G06F 17/18 |
| 2004/0059950 A1* | 3/2004 | Bender | G06F 21/316 713/186 |
| 2004/0187037 A1* | 9/2004 | Checco | G06F 21/31 382/115 |
| 2005/0060448 A1* | 3/2005 | Gutowitz | G06F 3/018 710/72 |
| 2006/0280339 A1* | 12/2006 | Cho | G07C 9/37 382/115 |
| 2007/0097085 A1* | 5/2007 | Iwatsuki | G06F 3/04886 345/173 |
| 2008/0028231 A1* | 1/2008 | Bender | G06F 21/316 713/186 |
| 2008/0270141 A1* | 10/2008 | Childress | G06Q 10/10 704/E17.001 |
| 2009/0055732 A1* | 2/2009 | Motaparti | G06F 40/274 715/261 |
| 2011/0214053 A1* | 9/2011 | Scott | G06F 40/232 715/764 |
| 2012/0167009 A1* | 6/2012 | Davidson | G06F 40/274 715/816 |
| 2012/0280950 A1* | 11/2012 | Stephanick | G06F 3/0236 345/179 |
| 2013/0263240 A1* | 10/2013 | Moskovitch | H04L 63/0861 726/7 |
| 2013/0335331 A1* | 12/2013 | Osman | G06F 3/018 345/171 |
| 2014/0229848 A1* | 8/2014 | Zhang | G06F 3/0484 715/745 |
| 2014/0247222 A1* | 9/2014 | Ferren | G06V 40/16 345/168 |
| 2015/0169854 A1* | 6/2015 | Chang | G06F 21/32 340/5.85 |
| 2015/0355836 A1* | 12/2015 | Gummadidala | G06F 3/023 715/773 |
| 2017/0003876 A1* | 1/2017 | Marsden | G06F 3/0231 |
| 2017/0157482 A1* | 6/2017 | DeCarlo | A63B 63/083 |
| 2017/0336969 A1* | 11/2017 | Bi | G06F 40/274 |
| 2018/0181245 A1* | 6/2018 | Beck | G06F 3/04883 |
| 2018/0365784 A1* | 12/2018 | Sartori | G06Q 50/26 |
| 2019/0130168 A1* | 5/2019 | Khitrov | G06N 3/045 |
| 2019/0207975 A1* | 7/2019 | Wardman | H04L 63/1483 |
| 2019/0334940 A1* | 10/2019 | Bar Noy | H04L 43/04 |
| 2020/0097123 A1* | 3/2020 | Srinivasan | G06F 3/0418 |
| 2020/0118287 A1* | 4/2020 | Hsieh | G02B 27/0037 |
| 2020/0242825 A1* | 7/2020 | Kim | G06F 18/00 |
| 2021/0096237 A1* | 4/2021 | Patole | G01S 13/70 |
| 2021/0173555 A1* | 6/2021 | Kandur Raja | G06N 3/08 |
| 2021/0236044 A1* | 8/2021 | Arroyo-Gallego | A61B 5/4023 |
| 2021/0407481 A1* | 12/2021 | Yoshino | G10H 1/0008 |
| 2022/0058660 A1* | 2/2022 | Ivanov | G06F 3/023 |
| 2022/0083633 A1* | 3/2022 | Hazan | G06F 21/316 |
| 2022/0405367 A1* | 12/2022 | Sashihara | G06V 40/67 |

* cited by examiner

FIG. 1

```
FONT VARIABILITY AXIS

Character Weight
# font-weight: min-value max-value
font-weight: 100 1000;

Character Width
# font-stretch: min-value max-value
font-stretch: 25% 151%;

Character Slant
# slnt = font-slant
# robofont has a range of -10 to 0

.slanted {
    /* Should be font-style: oblique 10deg; */
    font-variation-settings: 'slnt' 10;
}
```

FIG. 2

Optical Sizing

```
.small-yet-large {
  font-size: 100px;
  font-variation-settings: 'opsz' 8;
}
```

FIG. 3

Custom Interpolation Axis

Character Grade

```
.roboto-flex {
  # GRAD can be interpollated from -1 to 1
  font-variation-settings: 'GRAD' -0.875;
}
```

Define Interpolation Points

```
.grade-light {
    font-variation-settings: `GRAD` -1;
}

.grade-normal {
    font-variation-settings: `GRAD` 0;
}

.grade-heavy {
    font-variation-settings: `GRAD` 1;
}
```

FIG. 4

Kerning

```
@font-face {
    font-family: 'Roboto Flex';
    src: url('RobotoFlex-VF.woff2') format('woff2 supports variations'),
        url('RobotoFlex-VF.woff2') format('woff2-variations');
    font-weight: 100 1000;
    font-stretch: 25% 151%;
}
```

FIG. 5

Font Variation Settings

```
/* Set the default values */
:root {
    --slnt: 0;
    --GRAD: 0;
}

/* Change value for these elements and their children */
.slanted {
    --slnt: 10;
}

.grade-light {
    --grad: -1;
}

.grade-normal {
    --grad: 0;
}

.grade-heavy {
    --grad: 1;
}

/* Apply whatever value is kept in the CSS variables */
.slanted,
.grade-light,
.grade-normal,
.grade-heavy {
    font-variation-settings: 'slnt' var(--slnt), 'GRAD' var(--GRAD);
}
```

FIG. 8 let's see what kind of input I'll generate todaylooks like many people start with wide kerning then end up with narrowless bold then more boldwonder if typing style would change if this were cod

DIGITAL PENMANSHIP

CROSS REFERENCE TO RELATED APPLICATIONS

This application claims the priority benefit of U.S. Provisional Patent Application No. 63/327,090, filed Apr. 4, 2022, and International Patent Application No. PCT/US2022/022756, filed Mar. 31, 2022, which claimed the priority benefit of U.S. Provisional Patent Application No. 63/168,516, filed Mar. 31, 2021, the contents of which are incorporated by reference as if disclosed herein in their entireties.

FIELD

The present technology generally relates to the area of keystroke dynamics, and more particularly, to systems and methods of using a variable font make real-time alterations to the depiction of digital text input by a user based on the user's keystroke dynamics.

BACKGROUND

Traditional forms of digital non-verbal communication, such as sending digital text messages, posting in social media platforms, etc., are unable to properly convey the innate non-verbal connotations of an individual's messages. For example, traditional means of typing and sending a message lack a means of effectively communicating the sender's vocal cues (e.g., cadence, volume, intonation, etc.) and body language (e.g., hand gestures, facial expressions, stance, etc.) that would indicate the sender's emotions underlying the message. This results in the frequent miscommunication found in digital communications. Although emojis represent the closest current solution to this problem, emojis inefficiently require additional text input and still lack the innate non-verbal connotations of an individual's message.

What is needed, therefore, is an improved system and method of presenting digitally typed text that addresses the problems described above.

SUMMARY

According to an embodiment of the present technology, a method of altering the depiction of digital text input by a user is provided. The method includes the steps of: receiving a set of keystrokes on a keyboard input by the user, the set of keystrokes including a plurality of text characters configured to be rendered on a display in communication with the keyboard; determining a keystroke dynamics of the user based on the set of keystrokes, the keystroke dynamics including time-of-flight data and dwell time data for each keystroke of the set of keystrokes; analyzing the set of keystrokes with the keystroke dynamics to determine the hand dominance of the user and to generate a keystroke score for each keystroke of the set of keystrokes; altering at least a portion of the text characters based on the analysis of the set of keystrokes with the keystroke dynamics; and rendering the at least partially altered text characters on the display.

In some embodiments, determining the hand dominance of the user includes calculating a ratio of actual overlapping keystrokes to potential overlapping keystrokes for the left hand and the right hand of the user.

In some embodiments, the actual overlapping keystrokes are based, at least in part, on the time-of-flight data.

In some embodiments, the potential overlapping keystrokes are based, at least in part, on a series of di-graphs for sequential keystrokes.

In some embodiments, the potential overlapping keystrokes are based, at least in part, on a series of tri-graphs for sequential keystrokes.

In some embodiments, determining the actual overlapping keystrokes and the potential overlapping keystrokes includes: determining, for each keystroke, if the keystroke is in a left-hand location, a right-hand location, or a middle location of the keyboard; recording a potential overlap if the keystroke is in the left-hand location or the right-hand location and the preceding keystroke is in the same location; determining, if a potential overlap was recorded, if an active keypress list has a value greater than one; and recording an actual overlap if the active keypress list has a value greater than one and no release time.

In some embodiments, the keystroke score for each keystroke of the set of keystrokes is based, at least in part, on a combination of di-graphs and tri-graphs.

In some embodiments, the keystroke score for each keystroke of the set of keystrokes is based, at least in part, on the typing speed of the user.

In some embodiments, generating the keystroke score for each keystroke of the set of keystrokes includes: capturing, for each keystroke, a press time; and performing a weight mapping function on each keystroke and its respective press time to determine the outputted typeface weight of each keystroke.

In some embodiments, the weight mapping function includes: analyzing each keystroke to determine if a lapse in typing occurred; resetting, if a lapse in typing is detecting, a press time of the first keystroke in a sequence of keystrokes of the set of keystrokes to when the lapse occurred and resetting a total number of keystrokes in the sequence of keystrokes to one; calculating a global typing speed of the user for the set of keystrokes; calculating a local typing speed of the user for the sequence of keystrokes; calculating individual typing speeds of the user for each keystroke; generating an overall typing speed of the user based, at least in part, on the global typing speed, the local typing speed, and the individual typing speeds; and determining the outputting typeface weight of each keystroke based, at least in part, on the overall typing speed.

In some embodiments, the global typing speed includes an average typing speed for the set of keystrokes, a variance in typing speeds for the set of keystrokes, and a current typing speed.

In some embodiments, the local typing speed includes an average typing speed for the sequence of keystrokes, a variance in typing speeds for the sequence of keystrokes, and a current typing speed.

In some embodiments, each individual typing speed includes an average typing speed for all instances that each keystroke was pressed, a variance in the typing speeds for all instances that each keystroke was pressed, and a current typing speed.

In some embodiments, the keystroke score for each keystroke of the set of keystrokes is based, at least in part, on the dwell time of each keystroke.

In some embodiments, analyzing the set of keystrokes with the keystroke dynamics further includes determining a custom interpolation axis. In some embodiments, the custom interpolation axis includes a character grade axis configured to change the font weight of the text characters without changing the font width of the text characters.

In some embodiments, analyzing the set of keystrokes with the keystroke dynamics further includes determining at least one of font size of kerning of the text characters.

In some embodiments, analyzing the set of keystrokes with the keystroke dynamics further includes determining font variation settings of the text characters.

In some embodiments, the text characters are altered and displayed in real-time as the user inputs the keystrokes.

According to another embodiment of the present technology, a system for altering the depiction of digital text input by a user is provided. The system includes a keyboard that is configured to receive a set of keystrokes input by the user. A processor is in communication with the keyboard. The processor is configured to receive signals representing the set of keystrokes from the keyboard and perform the method described above via a variable font algorithm. A display is in communication with the processor for rendering the at least partially altered text characters.

According to an alternative embodiment of the present technology, a method of altering the depiction of digital text input by a user is provided. The method includes the steps of: receiving a set of keystrokes on a keyboard input by the user, the set of keystrokes comprising a plurality of text characters configured to be rendered on a display in communication with the keyboard; determining a keystroke dynamics of the user based on the set of keystrokes; analyzing the set of keystrokes with the keystroke dynamics; altering at least a portion of the text characters based on the analysis of the set of keystrokes with the keystroke dynamics; and rendering the at least partially altered text characters on the display.

In some embodiments, determining the keystroke dynamics includes analyzing at least one keystroke factor.

In some embodiments, the at least one keystroke factor includes time-of-flight, time-of-flight being the time between consecutive keystrokes of the set of keystrokes. In some embodiments, the at least one keystroke factor includes dwell time, dwell time being the duration of a keystroke of the set of keystrokes.

In some embodiments, analyzing the set of keystrokes with the keystroke dynamics includes determining a font variability axis based on text character weight, text character width, and text character slant.

In some embodiments, analyzing the set of keystrokes with the keystroke dynamics includes determining an optical size at which to render the text characters.

In some embodiments, analyzing the set of keystrokes with the keystroke dynamics includes determining a custom interpolation axis. In some embodiments, the interpolation axis includes a character grade axis configured to change the font weight of the text characters without changing the font width of the text characters.

In some embodiments, analyzing the set of keystrokes with the keystroke dynamics includes determining a plurality of font parameters of the text characters. In some embodiments, the plurality of font parameters includes front size and kerning.

In some embodiments, analyzing the set of keystrokes with the keystroke dynamics includes determining font variation settings of the text characters.

In some embodiments, analyzing the set of keystrokes with the keystroke dynamics includes calculating font interpolation of the text characters via polynomial regression, rate of change, and tangency calculations.

In some embodiments, the polynomial regression calculation includes the steps of: calculating time-of-flight data including time-of-flight values for each keystroke of the set of keystrokes; logging the time-of-flight data; arranging, via a function, the time-of-flight data in order from least to greatest based on their respective values; and calculating, via a logarithmic regression, an equation of the curve of best fit for the arranged time-of-flight data.

In some embodiments, the equation of the curve of best fit is updated for the first 200 keystrokes of the set of keystrokes and is further updated at an exponential rate for keystrokes after the first 200 keystrokes.

In some embodiments, the rate of change calculation comprises the slope intercept formula, y=mx+b and f'(x)=the equation of the curve of best fit for the arranged time-of-flight data.

In some embodiments, for each keystroke inputted by the user the rate of change calculation includes the steps of: finding the inverse of the equation of the curve of best fit for the arranged time-of-flight data; solving for x of the slope intercept formula when y is equal to the time-of-flight of the current keystroke; finding f'(x); finding the inverse of f'(x); solving f'(x)=0 to determine critical points of the curve of best fit; finding f'(x); evaluating f'(x) for when x is equal to the critical points of the curve of best fit; and solving f'(x) with x equal to the time-of-flight of the current keystroke to determine the value of the slope at the current keystroke.

In some embodiments, the tangency calculation includes determining a tangent line for the curve at the current keystroke.

In some embodiments, calculating font interpolation of the text characters of the set of keystrokes determines font interpolation data including rate of change, slope minimum, slope maximum, position of the time-of-flight value of each keystroke in the range of the time-of-flight data, time-of-flight data minimum, time-of-flight data maximum, and time-of-flight value frequency.

In some embodiments, the step of altering at least a portion of the text characters is based on the font interpolation data.

In some embodiments, the text characters are altered and displayed in real-time as the user inputs the keystrokes.

According to another embodiment of the present technology, a system for altering the depiction of digital text input by a user is provided. The system includes a keyboard that is configured to receive a set of keystrokes input by the user. A processor is in communication with the keyboard. The processor is configured to receive signals representing the set of keystrokes from the keyboard and perform the method described above via a variable font algorithm. A display is in communication with the processor for rendering the at least partially altered text characters.

In some embodiments, the keyboard, the processor, and the display are integrated together in a computing device.

In some embodiments, the keyboard and the display are integrated together in a computing device, and the processor is located in a server in communication with the computing device via a communication network. In some embodiments, the communication network is a wireless network.

In some embodiments, at least one external display is in communication with the server via the communication network. The at least one external display is configured to render the at least partially altered text characters.

Further objects, aspects, features, and embodiments of the present technology will be apparent from the drawing figures and below description.

DETAILED DESCRIPTION

Embodiments of the present technology are directed to a digital variable font that responds to a user's keystroke dynamics (e.g., biometrics). In some embodiments, the present technology uses variable fonts to ensure a seamless application across multiple devices. Research in cyber security and human computer interaction has found that each individual has their own unique keystroke pattern, similar to how individuals have their own unique penmanship, and that this keystroke pattern can be used to verify or identify an individual's identity. Embodiments of the present technology are directed to systems and methods of mapping a user's keystroke dynamics and altering the depiction of each individual character based on the user's input. The present technology has utility in text-based communication platforms and addresses the loss of non-verbal communication within text-based many-to-many communication platforms (i.e., social media platforms).

Figure 1:
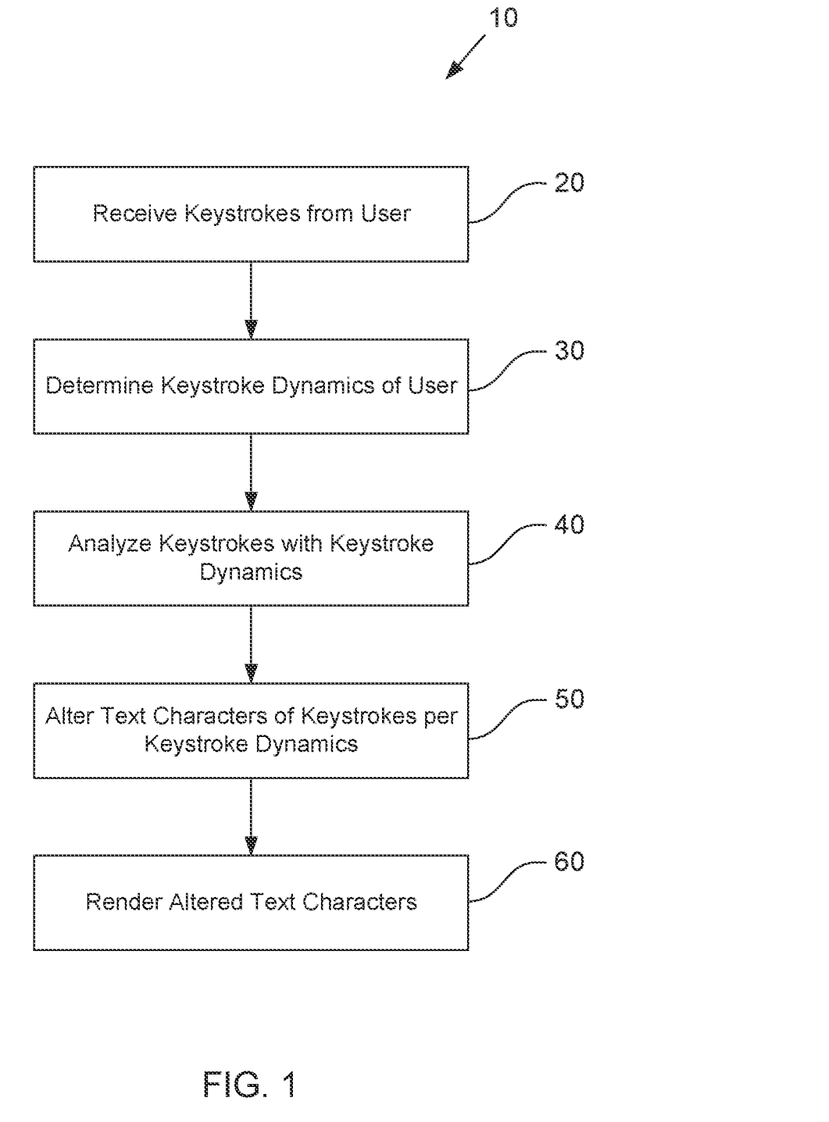
FIG. 1 is a flowchart showing the method steps of altering the depiction of digital text input by a user via a variable font algorithm according to an exemplary embodiment of the present technology.

FIG. 1 is a flowchart showing the steps of a digital variable font method 10 (i.e., a method of altering the depiction of digital text input by a user) according to an exemplary embodiment of the present technology. In step 20, the method 10 includes receiving a set of keystrokes input by a user on a keyboard. The set of keystrokes represents a plurality of text characters desired by the user to be rendered on a display that is in communication with the keyboard. In some embodiments, the keyboard is a virtual keyboard, and the keyboard and the display are integrated together as part of a computing device, such as a smartphone, tablet, etc. In some embodiments, the keyboard is a physical keyboard, and the keyboard and the display are separate components of a computing device, such as desktop computer, laptop computer, etc.

Some embodiments of the present technology use keystroke dynamics (e.g., biometrics) as a variable font interpolator. For example, as shown in FIG. 1, step 30 of the method 10 includes determining a keystroke dynamics of the user based on the set of keystrokes. In some embodiments, determining the keystroke dynamics includes accounting for, or analyzing, one or more keystroke factors. In some embodiments, the keystroke factors includes one or more of time-of-flight ("TOF") and dwell time. TOF is the time between individual keystrokes. A negative TOF is indicative of two or more keys being pressed at the same time (i.e., simultaneous keystrokes). Dwell time is the duration for which a key is pressed down (i.e., the keystroke period).

Figure 2:
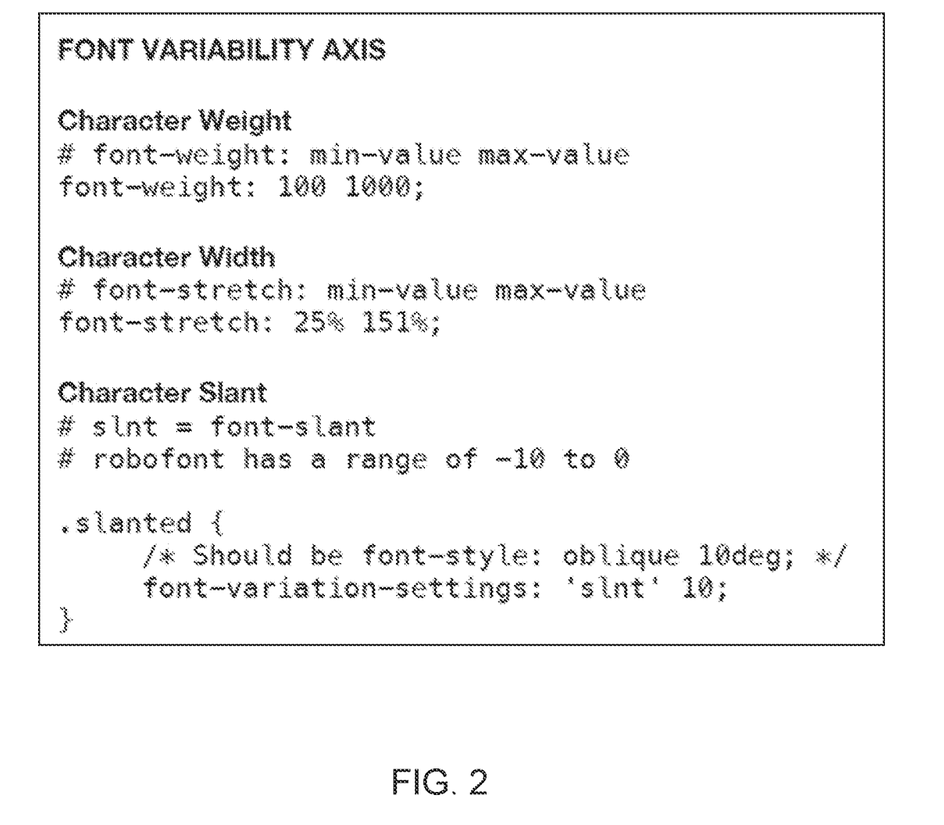
FIG. 2 shows pseudocode for determining a font variability axis according to an exemplary embodiment of the present technology.

In step 40, the method 10 includes analyzing the set of keystrokes with the keystroke dynamics, as shown in FIG. 1. In some embodiments, analyzing the set of keystrokes includes determining a font variability axis based on text character weight, text character width, and text character slant. FIG. 2 shows pseudocode for determining a font variability axis according to an exemplary embodiment of the present technology.

Figure 3:
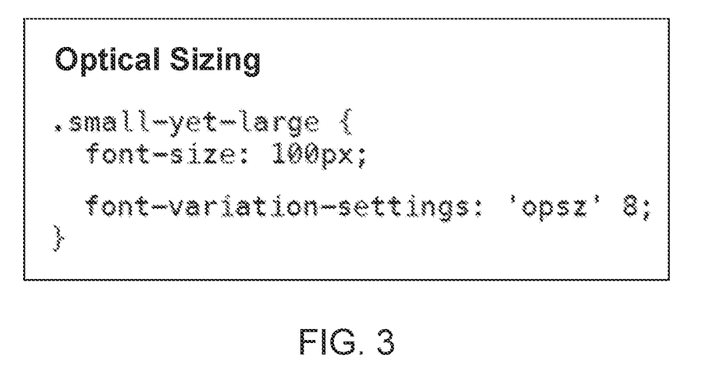
FIG. 3 shows pseudocode for determining an optical size for rending the text characters according to an exemplary embodiment of the present technology.

In some embodiments, analyzing the set of keystrokes includes using optical sizing to determine how to render the text characters. By using optical sizing, a typeface can be rendered very small (e.g., a 12px footnote) or very large (e.g., an 80px headline). Fonts respond to these size changes by changing its letter shapes to better suit its size. A small size might be better off without fine details, while a large size might benefit from more details and thinner strokes. In some embodiments, the default for the font is auto, which means the algorithm analyzing the set of keystrokes (e.g., an algorithm operating locally on a user's computing device via a processor, an algorithm operating remotely via a server in communication with the user's computing device, an algorithm operating via an internet browser, etc.) will pick the best optical sizing for the font-size at which the characters are being rendered. In some embodiments, optical sizing allows a user to define their own optical sizing regardless of the size at which the font is being rendered. FIG. 3 shows pseudocode for determining an optical size for rending the text characters according to an exemplary embodiment of the present technology.

Figure 4:
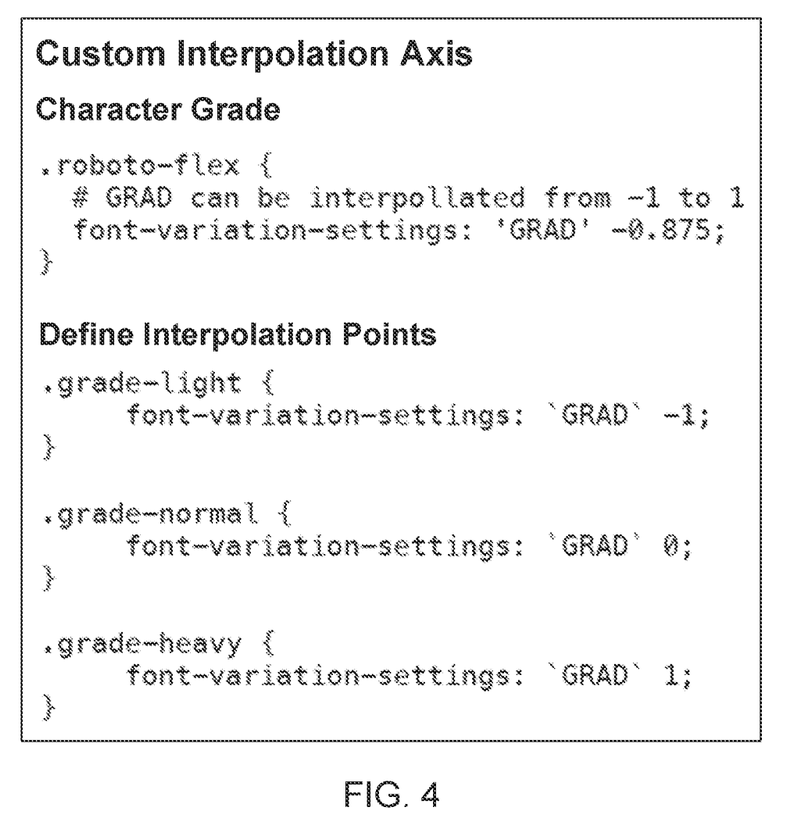
FIG. 4 shows pseudocode for determining a custom interpolation axis according to an exemplary embodiment of the present technology.

In some embodiments, analyzing the set of keystrokes includes determining a custom interpolation axis. In some embodiments, the custom interpolation axis is a character grade axis that is configured to change the weight of the font of the text characters without changing the width of the font of the text characters such that line breaks do not change. By adjusting the character grade axis, embodiments of the present technology avoid being forced to make changes to the font weight axis that affect the overall font width, and then make changes to the font width axis that affect the overall font weight. FIG. 4 shows pseudocode for determining a character grade axis ("GRAD") according to an exemplary embodiment of the present technology. As GRAD is a custom font variation setting, the interpolation points are first defined, as shown in FIG. 4. Further details of the font variation settings are discussed below with reference to FIG. 6.

Figure 5:
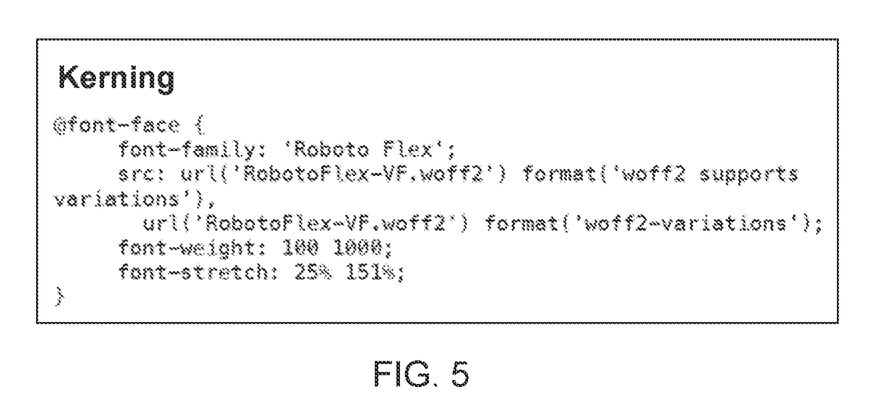
FIG. 5 shows pseudocode for determining the kerning font parameter according to an exemplary embodiment of the present technology.

In some embodiments, analyzing the set of keystrokes includes determining a plurality of font parameters. In some embodiments, the font parameters includes font size and kerning. Kerning is the space between the individual, consecutive, adjacent text characters. FIG. 5 shows pseudocode for determining the kerning font parameter according to an exemplary embodiment of the present technology.

Figure 6:
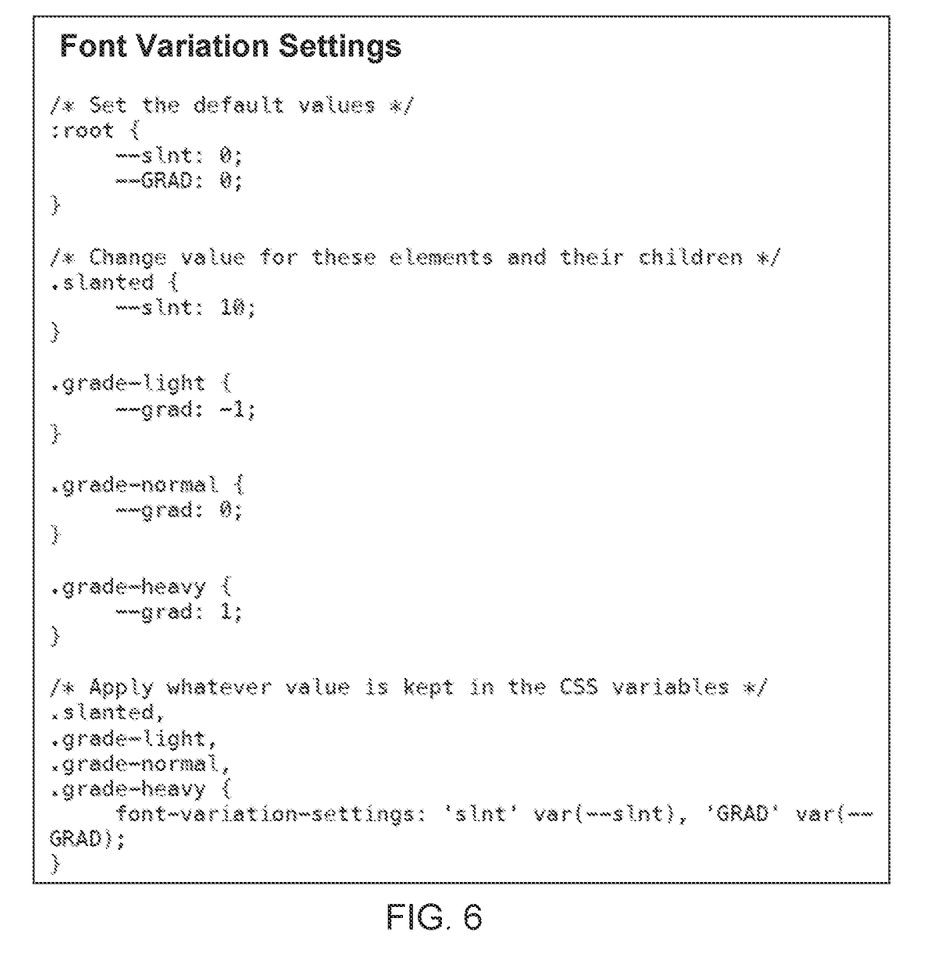
FIG. 6 shows pseudocode for determining the font variation settings according to an exemplary embodiment of the present technology.

In some embodiments, analyzing the set of keystrokes includes determining font variation settings of the text characters. Traditionally, font variation settings are not inherited. For example, it an html component has two IDs, where one defines the slant and the other defines the GRAD, then only the parameter of the second ID will be rendered. Embodiments of the present technology overcome this limitation by using CSS variables. FIG. 6 shows pseudocode for determining the font variation settings according to an exemplary embodiment of the present technology.

In some embodiments, analyzing the set of keystrokes includes calculating font interpolation of the text characters through polynomial regression, rate of change, and tangency calculations. Regarding polynomial regression, a TOF value for each keystroke is preferably calculated, logged, and passed to a function that reorders the values from least to greatest. A logarithmic regression is performed to calculate the equation of the curve of best fit for the ordered TOF data as if it were to be graphed. This equation is preferably updated for the first 200 keystrokes of the set of keystrokes, and then the rate at which it is further updated is increased exponentially for keystrokes after the first 200 keystrokes of the set of keystrokes.

Regarding the rate of change calculations, embodiments use the slope intercept formula, y=mx+b, and f'(x)=the equation of the curve of best fit that was outputted by the logarithmic regression function. In some embodiments, the steps outlined below are executed each time a user presses a key (i.e., inputs a keystroke):

1. Find the inverse of the equation for the curve of best fit that was outputted by the logarithmic regression function;
2. Solve for x when y is equal to the current TOF value for determining where that TOF value falls in the range of the TOF data;
3. Find f'(x) (i.e., the derivative of the function f(x));
4. Find the inverse of f'(x) to account for situations when the algorithm cannot solve for x when y=0;
5. Solve f'(x)=0 to determine the critical points, such as points where a potential maximum and minimum exist, which values are necessary for mapping the slope to the font attributes, as discussed below. Evaluating x when y=0 is also used to determine inflection points;
6. Find f''(x) (i.e., the second derivative of the function f'(x)) to find concavity and verify whether the critical points are maximums, minimums, or inflection points;
7. Solve f'(x) for x=(f'(x)=0) (i.e., evaluate f'(x) for when x is equal to the critical points; and
8. Plug x value of the indicated point into f'(x) to find the slope at x for determining the value of the slope at the point in question.

Each time a user presses a key, the series of steps outlined above is executed, evaluating the TOF value using the equation that was outputted by the logarithmic regression to determine the rate of change (slope) at the point where the current TOF value falls on the graph of the TOF data. Here, y is where the TOF value falls in the ordered list of TOF data for the keystrokes. When evaluated, y will be some number between 0 and the total number of TOF values that were included when performing the polynomial regression that generated the equation.

Some embodiments account for TOF value frequency. For example, if a TOF value exists multiple times in the data set, then the equation will return a decimal that is the average of all the positions that that TOF value exists. If a TOF value does not exist in the data set, then the equation will return a number that is representative of the two values that the TOF value falls between, where the integer is the lower value of the two, and the decimal point that follows the integer is proportionate to the position of the TOF value in the range between the two existing values. At this point, the following have been determined: the TOF value for the last-entered keystroke; the position of that TOF value in the ordered list of TOF data that was used to generate the equation for the best fit curve of the data; and the equation for the curve of beset fit.

In some embodiments, to determine the rate of change of the curve, the tangent line for the curve at the point in question is determined. A tangent line is a straight line that touches a curve at an individual point. It is important to note that even though the tangent touches the curve, it does not ever cross through the curve. The point where a tangent line meets a curve is referred to as the point of tangency. The slope of the curve, y=f'(x) at the point in question is equal to the y value that is outputted when the derivative is evaluated for f'(x)=TOF and slope is the rate of change.

In some embodiments, to generate the tangent of the curve, the derivative of the equation is determined to then evaluate it with the pre-defined x value and calculate the gradient. Preferably, the equation to generate is: y−y1=m (x−x1), where m is equal to the gradient and y1 and x1 are equal to x and y, respectively, as determined above for the rate of change calculation. This equation is used to determine the equation for the tangent of the curve. This equation is in point slope form. At this point, the following has been determined:

$$y1=f(xTOF); x1=xTOF; gradient=f(-1)(xTOF)[\text{the derivative of the function}]$$

Equation for the tangent of the curve at point(xTOF, yTOF) var tan EQ=(m*x)−(m*x1)+y1;

After the above font interpolation calculations are run, the following font interpolation data are returned: rate of change ("ROC"); slope minimum; slope maximum; position of the TOF value in the range of TOF data; data minimum (TOF, 0); data maximum (TOF, Y-position); and TOF value frequency. This information is then used to determine the values used to directly manipulate the rendering of the font, as discussed below.

In some embodiments, analyzing the set of keystrokes includes determining the hand dominance of the user. Hand dominance is calculated using the ratio of actual versus possible overlapping keystrokes for the left and right hand. Key location was determined using the Qwerty keyboard. Careful consideration was given to diversity of typing styles when determining hand mapping values. Keys 'q', 'w', 'e', 'a', 's', 'd', 'z', 'x', and 'c' were designated to the left hand. Keys 'u', 'o', 'p', 'h', 'k', 'l', 'n', and 'm' were designated to the right hand. The remaining keys—'r', 't', 'y', 'g', 'v', and 'b'—were assigned neither left nor right hand because they were in the center of the keyboard and could be pressed by either the right or left hands.

Figure 10:
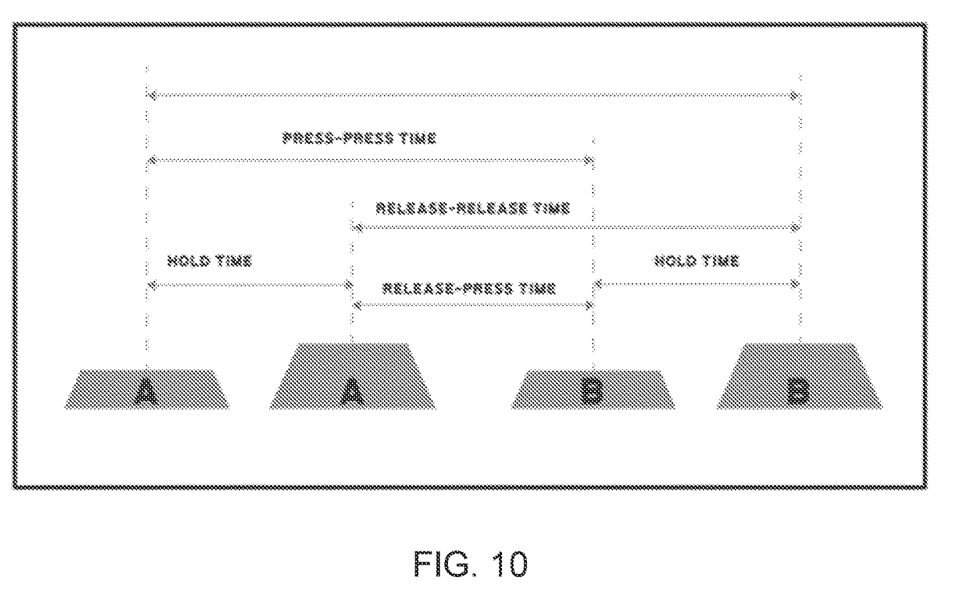
FIG. 10 shows an exemplary keystroke di-graph.

In some embodiments, keyboard instances were determined using a series of di-graphs, sequential keystrokes. FIG. 10 shows an example of a keystroke di-graph. Each time a key is pressed, its location is temporarily stored in the application. If the current keystroke's location is the same as the previous key's location, then it is registered as a potential instance for same hand overlapping strokes. Each time a potential instance is registered, it increases the Potential Instance Score (PIS) for the registered hand by one. In some embodiments, TOF is used to determine the Actual Instance Score (AIS). As previously mentioned, TOF is the difference between when key1 is released and key2 is pressed. A negative TOF is indicative of two keys being in the down position at the same time. While TOF is a valuable metric, the release time from the first key is calculated. However, if two keys are both in the down state, then the release time of the first key is unavailable.

Figure 11:
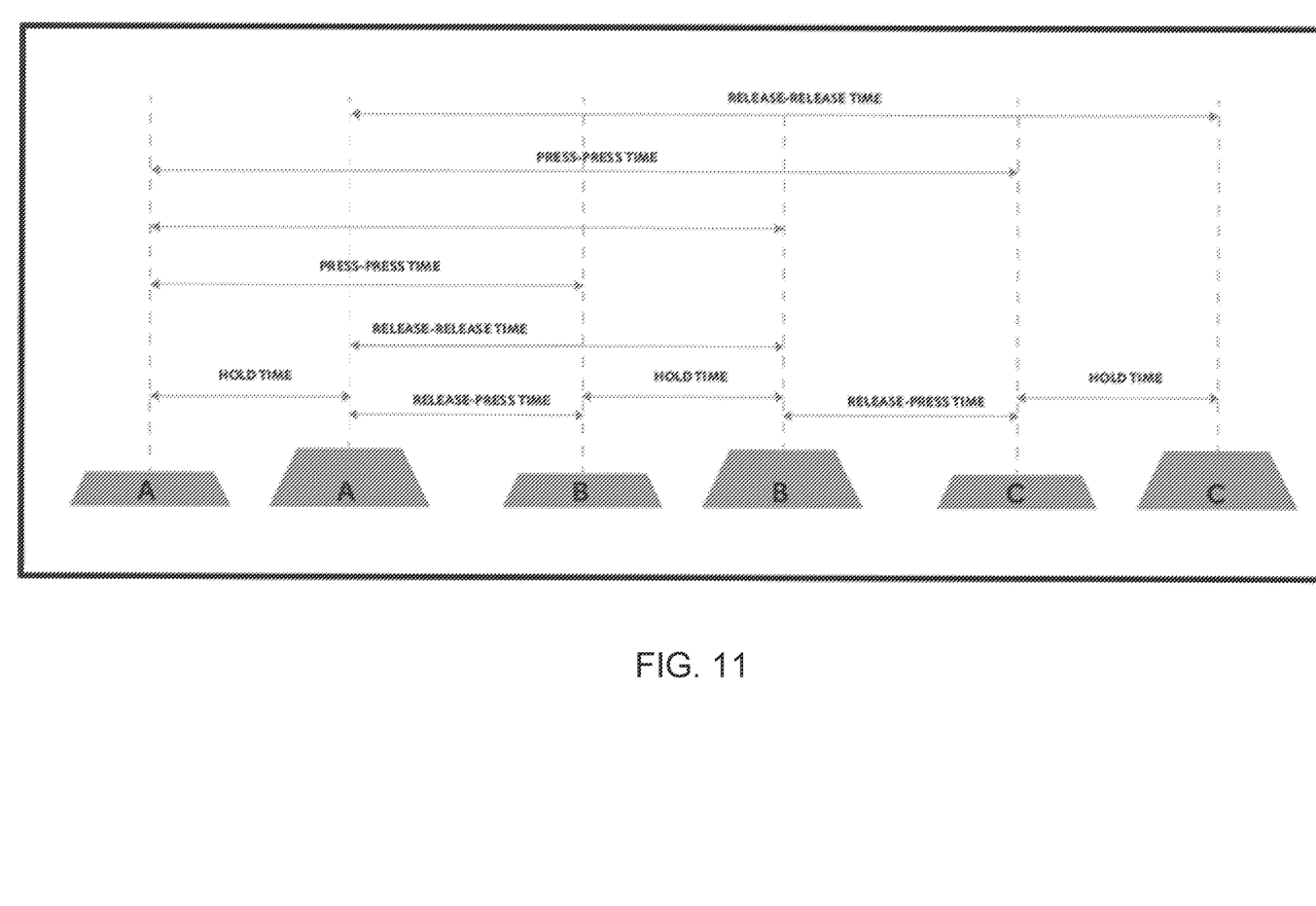
FIG. 11 shows an exemplary keystroke tri-graph.

Some embodiments use alternative solutions to determine if two keys were pressed at the same time. One alternative embodiment adds and removes a key from a list when it was pressed and released, respectively. Using this methodology, when a key is pressed, if the list length is greater than one then that means that two keys are in the down state. While this methodology provides a distinct answer regarding whether two keys are being pressed at the same time, it makes the assumption that only two sequential keys can be pressed down at the same time. The usage of tri-graphs in keystroke feature extraction shows that this is not the case. FIG. 11 shows an example of a keystroke tri-graph. Using this methodology will provide the correct answer the majority of the time, however it is not absolute.

Another alternative embodiment checks to see if the release time for the prior key exists, and if it does not exist then it assumes it is still pressed. Logically this methodology should always return the correct value, however, to ensure that the lack of release time is not resultant from an error somewhere else in the code, some embodiments combine this methodology with the previous one. The new resulting methodology is the following:

1. A key is pressed by the individual triggering an event;
2. The system registers the value of the key that was pressed and determines its location;
3. If the value is in middle, meaning it is neither left- nor right-hand, then the function returns a no-potential-overlap value and is concluded. If the pressed key is assigned either a left or right hand for its location value, then the system looks to see what the location value was for the prior key press. If the prior key location matches the current key location, then a potential instance is recorded for that location. If the values do not match, then the function returns a no-potential-overlap value and is concluded;
4. If a potential instance was recorded, then the system checks the active keypress list. If the length is greater than one, then there is a high likelihood that two keys are pressed. If the value is less than two, then there is only one key pressed at a time, and the system returns a no-overlap-present value and is concluded; and
5. If the key locations match and the keypress list is greater than one, then the function checks to see if the prior keypress has a release time. If it does have a release time, then the system returns a no-overlap-present value and is concluded. If it does not have a release time, then an actual overlap value is recorded for the key location.

After each keypress has occurred and the function has determined if there was an overlap, then the proportion of AIS to PIS is calculated for each hand: AIS/PIS. The resulting value should be some number between zero and one. The ratio of left hand to right hand is then determined. This process yields the following: 1) if there is one-hand that is more dominant than the other; 2) if there is a dominant hand, which hand is it.

To determine the direction of dominance a range is established where the left most value signifies the left hand and the right most value signifies the right hand. No dominance is indicated by a value directly in the center of the left and right values. Some embodiments negate the left hand's values, which creates a range from −1 to 1, where 0 represents an individual whose hands are equally weighted. The distance of the value from zero is representative of the strength of the dominance. The value of the resulting dominance can be calculated by adding the negated left-hand values (subtracting it) from the right-hand value. The number remaining will be some value between −1 and 1 that is indicative of the individual's hand dominance.

In some embodiments, to apply the resulting value to the rendered character, the resulted values are mapped to the slant property of the variable font. This will be a one-to-one relationship where −1 to 1 will be mapped to the maximum and minimum values for the variable fonts slant axis. Some embodiments use a linear mapping function.

In some embodiments, analyzing the set of keystrokes includes generating a keystroke score for each keystroke of the set of keystrokes using dynamic scaling. Dynamic scaling uses a combination of di-graphs and tri-graphs to generate a 'Keystroke Score' for each keypress that a user makes. The 'Keystroke Score' is built using a 'scoring model.' An example of a known scoring model is the FICO score used by companies to assess the financial health of an individual. Using the scoring model as a framework, multiple keystroke features can be combined to generate a system that is sensitive to changes, but also balanced in how drastic those changes appear in the output. This high sensitivity with built-in smoothing makes this mapping methodology an ideal choice for interpolating font weight.

"Keystroke Score" is centered around the user's typing speed, but it focuses on different ways of capturing speed within keystroke biometrics and where variances in speed might exist. The mapping process is triggered each time a key is pressed. The process begins by capturing the 'press time' for the current keystroke. Once the press time has been recorded it is passed along with the key value to the weight mapping function. The weight mapping function is responsible for taking the press time and key value and returning the outputted typeface weight.

In some embodiments, at the start of the weight function the keypress instance is analyzed to determine if a lapse in typing had occurred. A lapse in typing can be defined as a period of time where the user pauses their typing for an unknown reason that is irrelevant to their recorded typing biometrics. Checking for lapses in keystrokes is used to minimize the amount of inaccurate data existing within the system. A lapse in typing is calculated by subtracting the current press time from the previous press time. If the passed time is greater than a predetermined time, a lapse is said to have occurred. The time that passes between press times is referred to as the interval or the release-press time in keystroke biometrics. If a lapse is detected, then a reset will occur causing the start value to be reset to the moment when the lapse was triggered, and the number of keys pressed value will start back at one.

Within the "Keystroke Score" there are three categories that are calculated for local (tri-graph), global (overall), and individual (di-graph) scores. Each of these values impact the outputted weight value, however the amount of impact varies.

In some embodiments, the user's typing speed is calculated using the following equation:

$$\frac{T_{Curr} - T_{Start}}{TotalKeys} \qquad (1)$$

Where $T_{Curr}$ is the current key's press time; $T_{Start}$ is the press time of the first key in the sequence; and TotalKeys is the total number of keys in the given sequence. $T_{Curr}$ will remain constant between the three different values—global, local, and individual—but $T_{Start}$ and TotalKeys will vary. Once speed has been calculated it is stored within an array that contains all of the speeds that have been recorded during the current session.

In some embodiments, there are three components that factor into the global score: average speed for all key presses, variance in speeds for all key presses, and current speed. For each of these values, the values are mapped to a predetermined range, using the maximum and minimum values within the data sets. After mapping each parameter, the values are added up and mapped to the allotted global range, which is representative of the part of the whole that is made up of the global score. For the global score, $T_{Start}$ is the recorded start time, which is either the start of the typing session or when the lapse was recorded; and TotalKeys is the number of keys pressed since the start of the session or it is the number of keys pressed since the last lapse in keystrokes.

In some embodiments, there are three components that factor into the local score: average speed for the sequence, variance in speeds within the sequence, and current speed. For each of these values, the values are mapped to a predetermined range, using the maximum and minimum values within the data sets. After mapping each parameter, the values are added up and mapped to the allotted local range, which is representative of the part of the whole that is made up of the local score. For the local score, $T_{Start}$ is the recorded start time, which is either the press time of the first key in the tri-graph or, if there has not been three consecutive keystrokes, it is the first key in the new sequence; and TotalKeys is either three or if there has not been three consecutive keystrokes then the number is the quantity of keystrokes there have been, the number of keys pressed since the start of the session, or it is the amount of keys pressed since the last lapse in keystrokes.

In some embodiments, there are three components that factor into the individual key score: average speed for all instances that the key was pressed, variance in speeds among instances where the key was pressed, and current speed. However, they are only being considered in respect to the other instances where that key was pressed. In addition, if a key has only been pressed one time, then the value is added to the array, but there is not an individual score that exists. Instead, the mapping ranges adjust accordingly. If a key has been pressed more than one time, then the average, variance, and current speed is considered in respect to the previous instances. For each of these values, the values are mapped to a predetermined range, using the maximum and minimum values within the data sets. After mapping each parameter, the values are added up and mapped to the allotted individual key range.

After calculating each of the different areas of the score, the values are added up, generating an overall keystroke speed score. The outputted value is then mapped to the weight using the fonts maximum and minimum potential values and the minimum and maximum possible values for the outputted Keystroke Scores. The outputted values are representative of the weight of the pressed letter.

In some embodiments, the weight mapping function accounts for the multi-dimensional nature of emotions. The circumplex model of affect uses two dimensions to map emotions: valence and arousal. Under this model, valence is how pleasurable the emotion is and arousal is the energy behind it. In some embodiments, a weight mapping issue is the biproduct of the varying effects that valence and arousal have on a user's keystrokes. For example, emotions that have a higher arousal level have shorter dwell times, also known as the keystroke duration, when compared to those with lower arousal levels. This can be attributed to energy encompassed within the action. If a person is experiencing an emotion that is higher in arousal, then the emotion is higher in energy. This high energy level is then translated into their keypresses that are shorter in duration because of the greater amount of force being applied to them. Examples of emotions that are said to be lower in arousal level are tired or bored.

When it comes to keyboard latency, changes in valence of emotions can impact keyboard latency, where negative emotions result in slower keyboard latency values. In addition, in respect to negative emotions, the fastest keyboard latency values were found for medium arousal levels. For positive emotions that are high in energy the fastest keyboard latency values were found for the highest arousal levels. There to also an effect between the arousal level and the number of errors, where the higher the arousal level the more errors the participants make.

In some embodiments, the weight mapping process is indirectly influenced by the dwell time of the keystrokes; however, it is primarily built using keystroke latency. It can be assumed that if an emotion is positive and high energy, then the outputted value for font-weight will be mapped correctly. However, if the emotion has a negative valence, then stroke duration will map correctly, but keystroke latency will most likely not. Therefore, some embodiments employ an alternative computational method that isolates the valence and arousal components of emotion from one-another. This is achieved by focusing solely on the dwell time.

Dwell time is a key factor when assessing the effects of emotions on keystroke biometrics. To calculate dwell time, the key press time is subtracted from the key release time. Much like time of flight, which also has a release time to be calculated, dwell time is ill-suited for real-time typeface interpolation. For dwell time to be used in real-time calculations, a predictive model is generated to permit the use of other keystroke data and patterns within the user's typing to predict what the outputted dwell time will be.

In some embodiments, the alternative weight mapping function uses data distribution mapping and starts by taking in the following parameters: key value, start time, press number (what number press is it in the sequence), release time, pass number (used to control whether the current instance is for rendering text or creating the baseline distribution), and final (if the current key is the last item in the sequence).

In some embodiments, the weight mapping function starts by running the keypress through a series of processes to clean up the input data to help minimize errors. After ensuring the data is clean, the dwell time is calculated by subtracting the press time from the release time. The dwell time is then checked to make sure that it exists before passing it through the mapping distribution process, this will help to minimize errors and code breaking.

If the current pass is the first pass, meaning it is for building the baseline, then the key data is passed through a foundation build function that takes in the parameters key name, dwell time, and final. The foundation build function takes in the data that is passed to it and uses it to build an array. The function continues to do this until the value of final equals 1, which means that it is true. The foundation build then goes through the following steps to build out the baseline distribution:

1. Before the data distribution can be generated, it filters out any outliers that could skew the data and reorder the data set in order from least to greatest. These removed values are accounted for later in the rendered font weights;
2. Next, quantiles are generated. To do so, the simplified data point list along with the median value is passed to a quantile generator function. The quantile generator then takes the median and the list array of datapoints and uses it to construct two new arrays of data separated by the median value. The new data arrays are then returned to the foundation build function;
3. Now that the data split in half, each of the halves are used to generate the quantiles by passing each of the halves through the quantile generator function;
4. Next, maximum and minimum values for each of the quantiles are stored into an array, this will be used for mapping the new outputted weight value;
5. Account for outliers in the end mapping function, especially because when it comes to "Digital Penmanship" the outliers are where the changes in emotions exist. This is done by saving the minimum value from q1 (quantile 1) and the maximum value of q4 (quantile 4); and
6. Once the quantile values are stored, return the information to the weight calculation function.

After the baseline distribution is generated, the method passes the full dataset into the weight calculation function, as described below:

1. Before beginning the mapping process the data is checked to make sure that there are not any missing dwell time values. If there are any missing dwell times, then the function returns the last used weight value. If the dwell time does exist, then the function proceeds to the next step;
2. Next the application runs the dwell time through a series of if-then statements to determine which quantile the dwell time belongs in. The data point can exist in one of six areas: lower bound; quantile 1; quantile 2; quantile 3; quantile 4; and upper bound;
3. Once the quantile for the data point has been identified, it is passed to the weight mapping function along with the dwell time value, key that was pressed, quantile minimum value and quantile maximum value.
4. The mapping weight function then uses the quadrant location to define the minimum and maximum values for that segment and then passes those values to a linear mapping function.

In some embodiments, the variable font algorithm discussed herein can be applied to any variable font by assigning a computed value to a specific variable font axis. In some embodiments, the variable font used includes, but are not limited to, Noboto Flex, Pathway Extreme, Roboto Flex, IBM Plex Sans Variable, Recursive, and Space Grotesque Variable. In some embodiments, the variable font used is Grtsk Variable because of its unique ability to angle letters to the left and right. Grtsk Varaible is a variable font that features three variable axes: weight (min and max values), width (min and max values), and slant (min and max values). Although the number of axes that can be manipulated for the font are limited, it does include the most highly used axis types, weight and width, and it allows for both left and right letter slants.

Figure 9:
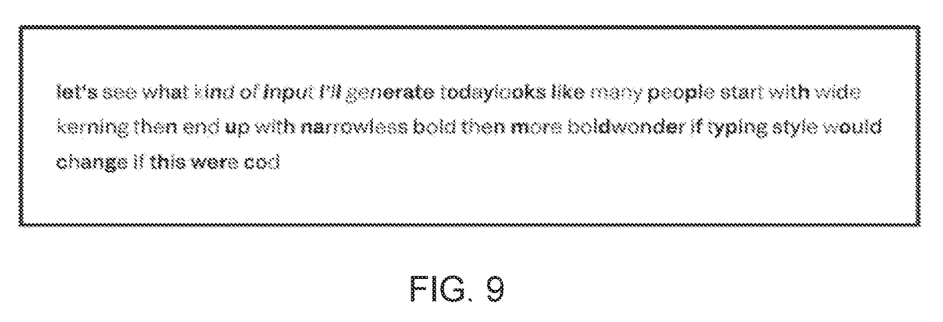
FIG. 9 shows a rendering of digital text input as at least partially altered via a variable font algorithm according to an exemplary embodiment of the present technology.

As shown in FIG. 1, step 50 of the method 10 includes altering at least a portion of the text characters based on the analysis of the set of keystrokes with the keystroke dynamics. For example, specific text characters or words of the set of keystrokes are altered to be rendered in different fonts, different font styles (e.g., bold, italic, underlined, etc.), different font sizes, etc. to effectively convey the user's innate non-verbal connotations (e.g., cadence, volume, intonation, etc. indicative of the user's emotion, mood, feelings, etc. that the user desired to be expressed through the set of keystrokes) underlying the set of keystrokes based on the user's keystroke dynamics. In step 60, method 10 includes rendering the at least partially altered text characters on the display that is in communication with the keyboard. Preferably, the method 10 occurs in real-time such that there is no delay, or no noticeable delay (e.g., an input lag time of less than 1 second, less than 500 milliseconds, less than 300 milliseconds, less than 100 milliseconds, less than 50 milliseconds, or less than 25 milliseconds), between the user inputting the keystrokes and the rendering of the altered text characters on the display. FIG. 9 shows an example rendering of the at least partially altered text characters. As shown, text characters within certain words have different font styles than the other text characters forming the same word. For example, the word "generate" is rendered have some text characters italicized and not bolded, while other text characters are bolded but not italicized.

Figure 7:
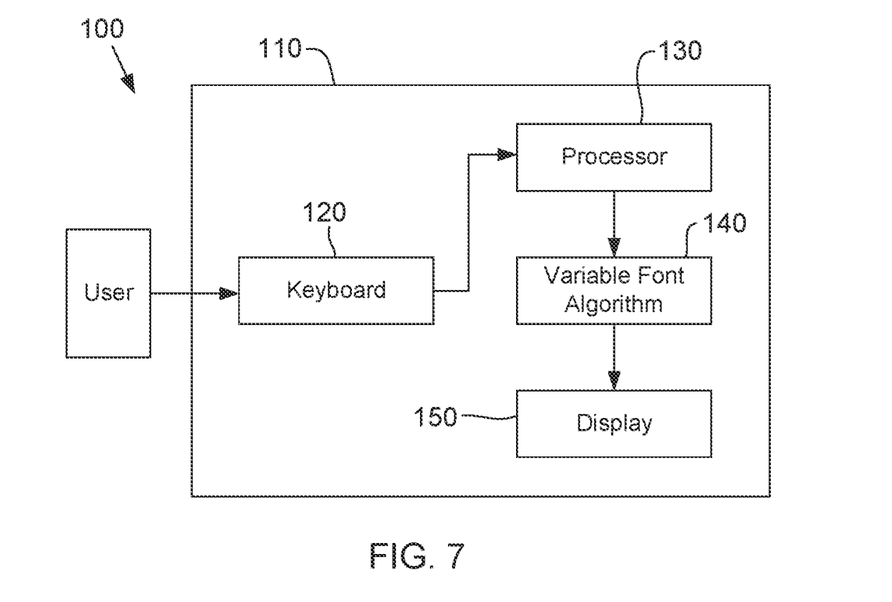
FIG. 7 is a schematic showing a digital variable font system according to an exemplary embodiment of the present technology.

FIG. 7 is a schematic showing a digital variable font system 100 (i.e., a system for altering the depiction of digital text input by a user) according to an exemplary embodiment of the present technology. The system 100 includes a computing device 110 having a keyboard 120, a processor 130, and a display 150. A user inputs keystrokes via the keyboard 120, which communicates signals representing the keystrokes to the processor 130. The processor 130 includes a computer readable medium that has software instructions stored thereon that, when executed by the processor 130, cause the processor 130 to perform the method 10 described above via a variable font algorithm 140. The system 100 renders the at least partially altered text characters resulting from executing the variable font algorithm 140 on the display 150. In some embodiments, the keyboard 120 is a virtual keyboard, and the keyboard 120 and the display 150 are integrated together as part of the computing device 110, such as a smartphone, tablet, etc. In some embodiments, the keyboard 120 is a physical keyboard, and the keyboard 120 and the display 150 are separate components of the computing device 110, such as desktop computer, laptop computer, etc.

Figure 8:
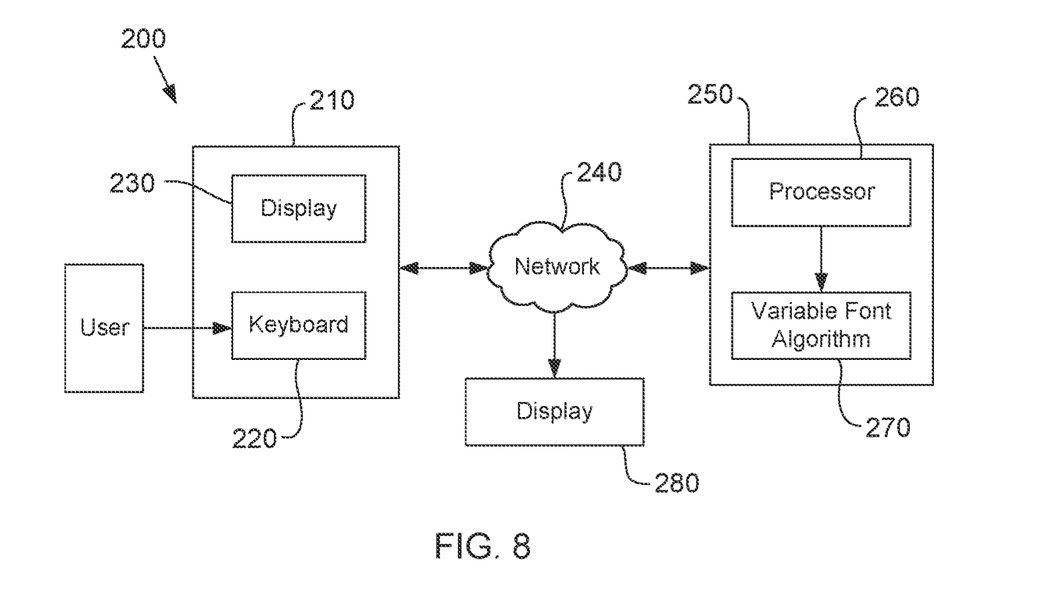
FIG. 8 is a schematic showing a digital variable font system according to an exemplary embodiment of the present technology.

FIG. 8 is a schematic showing a digital variable font system 200 (i.e., a system for altering the depiction of digital text input by a user) according to an exemplary embodiment of the present technology. The system 200 includes a computing device 210 having a keyboard 220 and a display 230. A user inputs keystrokes via the keyboard 220, which communicates signals representing the keystrokes to a server 250 via a communication network 240. The server 250 has a processor 260 that includes a computer readable medium that has software instructions stored thereon that, when executed by the processor 260, cause the processor 260 to perform the method 10 described above via a variable font algorithm 270. The server 250 communicates, via the communication network 240, the at least partially altered text characters for rendering on the display 230 of the computing device 210 and/or to one or more external displays 280 (e.g., a display of a computing device of one or more second users receiving the altered text characters as, e.g., a text message, a social media post, etc.). In some embodiments, the keyboard 220 is a virtual keyboard, and the keyboard 220 and the display 230 are integrated together as part of the computing device 210, such as a smartphone, tablet, etc. In some embodiments, the keyboard 220 is a physical keyboard, and the keyboard 220 and the display 230 are separate components of the computing device 220, such as desktop computer, laptop computer, etc. In some embodiments, the communication network 240 is a wired or wireless Internet, intranet, wide area network, local area network, or any other type of network or Internet known in the art.

Although the technology has been described and illustrated with respect to exemplary embodiments thereof, it should be understood by those skilled in the art that the foregoing and various other changes, omissions, and additions may be made therein and thereto, without parting from the spirit and scope of the present technology.

What is claimed is:

1. A method of altering the depiction of digital text input by a user, the method comprising:
   receiving a set of keystrokes on a keyboard input by the user, the set of keystrokes comprising a plurality of text characters configured to be rendered on a display in communication with the keyboard;
   determining a keystroke dynamics of the user based on the set of keystrokes, the keystroke dynamics comprising time-of-flight data and dwell time data for each keystroke of the set of keystrokes;
   analyzing the set of keystrokes with the keystroke dynamics to determine the hand dominance of the user and to generate a keystroke score for each keystroke of the set of keystrokes, wherein determining the hand dominance of the user comprises calculating a ratio of actual overlapping keystrokes to potential overlapping keystrokes for the left hand and the right hand of the user;
   altering at least a portion of the text characters based on the analysis of the set of keystrokes with the keystroke dynamics; and
   rendering the at least partially altered text characters on the display.

2. The method of claim 1, wherein the actual overlapping keystrokes are based, at least in part, on the time-of-flight data.

3. The method of claim 1, wherein the potential overlapping keystrokes are based, at least in part, on a series of di-graphs for sequential keystrokes.

4. The method of claim 1, wherein the potential overlapping keystrokes are based, at least in part, on a series of tri-graphs for sequential keystrokes.

5. The method of claim 1, wherein determining the actual overlapping keystrokes and the potential overlapping keystrokes comprises:
   determining, for each keystroke, if the keystroke is in a left-hand location of the keyboard, a right-hand location of the keyboard, or a middle location of the keyboard;
   recording a potential overlap if the keystroke is in the left-hand location or the right-hand location and the preceding keystroke is in the same location;
   determining, if a potential overlap was recorded, if an active keypress list has a value greater than one; and
   recording an actual overlap if the active keypress list has a value greater than one and no release time.

6. The method of claim 1, wherein the keystroke score for each keystroke of the set of keystrokes is based, at least in part, on a combination of di-graphs and tri-graphs.

7. The method of claim 1, wherein the keystroke score for each keystroke of the set of keystrokes is based, at least in part, on the typing speed of the user.

8. The method of claim 1, wherein the keystroke score for each keystroke of the set of keystrokes is based, at least in part, on the dwell time of each keystroke.

9. The method of claim 1, wherein analyzing the set of keystrokes with the keystroke dynamics further comprises determining a custom interpolation axis.

10. The method of claim 9, wherein the custom interpolation axis comprises a character grade axis configured to change the font weight of the text characters without changing the font width of the text characters.

11. The method of claim 1, wherein analyzing the set of keystrokes with the keystroke dynamics further comprises determining at least one of font size and kerning of the text characters.

12. The method of claim 1, wherein analyzing the set of keystrokes with the keystroke dynamics further comprises determining font variation settings of the text characters.

13. The method of claim 1, wherein the text characters are altered and displayed in real-time as the user inputs the keystrokes.

14. A system for altering the depiction of digital text input by a user, the system comprising:
   a keyboard configured to receive a set of keystrokes input by the user;
   a processor in communication with the keyboard, the processor configured to receive signals representing the set of keystrokes from the keyboard and perform the method of claim 1 via a variable font algorithm; and
   a display in communication with the processor for rendering the at least partially altered text characters.

15. A method of altering the depiction of digital text input by a user, the method comprising:
   receiving a set of keystrokes on a keyboard input by the user, the set of keystrokes comprising a plurality of text characters configured to be rendered on a display in communication with the keyboard;
   determining a keystroke dynamics of the user based on the set of keystrokes, the keystroke dynamics comprising time-of-flight data and dwell time data for each keystroke of the set of keystrokes;
   analyzing the set of keystrokes with the keystroke dynamics to determine the hand dominance of the user and to generate a keystroke score for each keystroke of the set of keystrokes, wherein generating the keystroke score for each keystroke of the set of keystrokes comprises capturing, for each keystroke, a press time, and performing a weight mapping function on each keystroke and its respective press time to determine the outputted typeface weight of each keystroke, the weight mapping function comprising:
   analyzing each keystroke to determine if a lapse in typing occurred;
   resetting, if a lapse in typing is detecting, a press time of the first keystroke in a sequence of keystrokes of the set of keystrokes to when the lapse occurred and resetting a total number of keystrokes in the sequence of keystrokes to one;
   calculating a global typing speed of the user for the set of keystrokes;
   calculating a local typing speed of the user for the sequence of keystrokes;
   calculating individual typing speeds of the user for each keystroke;

generating an overall typing speed of the user based, at least in part, on the global typing speed, the local typing speed, and the individual typing speeds; and determining the outputting typeface weight of each keystroke based, at least in part, on the overall typing speed;

altering at least a portion of the text characters based on the analysis of the set of keystrokes with the keystroke dynamics; and rendering the at least partially altered text characters on the display.

16. The method of claim 15, wherein the global typing speed comprises an average typing speed for the set of keystrokes, a variance in typing speeds for the set of keystrokes, and a current typing speed.

17. The method of claim 15, wherein the local typing speed comprises an average typing speed for the sequence of keystrokes, a variance in typing speeds for the sequence of keystrokes, and a current typing speed.

18. The method of claim 15, wherein each individual typing speed comprises an average typing speed for all instances that each keystroke was pressed, a variance in the typing speeds for all instances that each keystroke was pressed, and a current typing speed.

19. The method of claim 15, wherein the text characters are altered and displayed in real-time as the user inputs the keystrokes.

20. A system for altering the depiction of digital text input by a user, the system comprising:

a keyboard configured to receive a set of keystrokes input by the user;

a processor in communication with the keyboard, the processor configured to receive signals representing the set of keystrokes from the keyboard and perform the method of claim 15 via a variable font algorithm; and a display in communication with the processor for rendering the at least partially altered text characters.

* * * * *